(12) United States Patent
Nagata

(10) Patent No.: US 6,178,323 B1
(45) Date of Patent: Jan. 23, 2001

(54) SYSTEM AND METHOD FOR DETERMINING A TENTATIVE MASTER OF A RADIO CONFERENCE SYSTEM

(75) Inventor: Masahiro Nagata, Tokyo (JP)

(73) Assignee: NEC Corporation, Tokyo (JP)

( * ) Notice: Under 35 U.S.C. 154(b), the term of this patent shall be extended for 0 days.

(21) Appl. No.: 09/186,681

(22) Filed: Nov. 6, 1998

(30) Foreign Application Priority Data

Nov. 7, 1997 (JP) .................................................. 9-305856

(51) Int. Cl.[7] .................................................... H04M 3/42
(52) U.S. Cl. ........................ 455/416; 455/507; 455/517
(58) Field of Search .................................. 455/414, 416, 455/502, 507, 509, 511, 515, 517, 524; 379/202, 203, 204, 205, 206

(56) References Cited

U.S. PATENT DOCUMENTS

| | | | |
|---|---|---|---|
| 4,924,457 | * 5/1990 | shimizu | 455/507 |
| 5,276,678 | * 1/1994 | Hendrickson et al. | 379/202 |
| 5,475,867 | * 12/1995 | Blum | 455/507 |
| 5,619,553 | * 4/1997 | Young et al. | 455/463 |
| 5,889,844 | * 3/1999 | Kim et al. | 455/416 |
| 5,915,211 | * 6/1999 | Fujiwara | 455/67.1 |
| 6,026,303 | * 2/2000 | Minamissawa | 455/507 |

* cited by examiner

Primary Examiner—Dwayne D. Bost
Assistant Examiner—Quang Vu
(74) Attorney, Agent, or Firm—Ostrolenk, Faber, Gerb & Soffen, LLP

(57) ABSTRACT

A radio terminal 1 has a self-terminal information storing section 4 for storing terminal information of its own, an other terminal information storing section 3 for temporarily storing terminal information which is sent from other radio terminals, and a master determining section 2 for determining a radio terminal appropriate for being a tentative master, based on the stored terminal information. This master determining section 2 determines the tentative master based on the specified information of the terminal information such as transmission power, battery information and network address information. Since, if a user selects an appropriate radio terminal and starts the construction of a temporary network, the radio terminal acquires terminal information of all other terminals and determined an optimum tentative master, the network is then constructed while being the determined tentative master as a center, and communication can be conducted.

8 Claims, 5 Drawing Sheets

FIG.4

| TERMINAL | BATTERY | TRANSMISSION POWER | PROCESSING SPEED |
|----------|---------|--------------------|------------------|
| A | B1 | P1 | S1 |
| B | B2 | P2 | S2 |
| C | B3 | P3 | S3 |
| D | B4 | P4 | S4 |
| E | B5 | P5 | S5 |

SYSTEM AND METHOD FOR DETERMINING A TENTATIVE MASTER OF A RADIO CONFERENCE SYSTEM

BACKGROUND OF THE INVENTION

The present invention relates to a system for and a method of determining a tentative master of a radio conference system in case of bringing an unspecified number of radio terminals to arbitrary places, determining a tentative master thereof, temporally constituting a network by means of radio using the tentative master as a center, and conducting communication. Conventionally, as this kind of a system for determining a tentative master, there is a system disclosed in JP-A-245690/1991, for example.

FIG. 5 is a view showing the construction of the entirety of this conventional conference system between multi-points. Multi-points control units (referred to as MCUs, hereinafter) 50–52 are arranged at each position, respectively, and have jurisdiction over communication terminals within each of control areas 80–82 and conduct entire control of a conference. For example, the MCU 50 has jurisdiction over the communication terminal 40 indicated as "A", the MCU 51 has jurisdiction over the communication terminals 41–43 indicated as "B"–"D", and, the MCU 52 has jurisdiction over the communication terminals 44 and 45 indicated as "E" and "F" Communication circuits 60–65 are connecting circuits for connecting finally determined optimum MCUs to each of the terminals 40–45. Communication circuits 70 and 71 are connecting circuits which are used when a notice from the terminal 40 of the opening of the conference is issued to the MCU 51 by way of the MCU 50. Each of the MCUs has a terminal control table (kinds of the circuit, fee information and so forth).

The system shown in FIG. 5 operates as follows:

At first, in order to open a multi-points conference between the terminal 40 and other terminals 41–45, the circuit 70 is connected to the MCU 50 over which the terminal 40 has jurisdiction, and a demand for opening the conference is transmitted to the MCU 50. For determining an optimum MCU for controlling the said conference, the terminal control table is referred to by the MCU 50 that has received the demand, and the MCU 50 determines whether or not only its terminal control table has enough information. If the terminal control table has enough information, the optimum MCU is determined based on the information, the circuit is connected to the optimum MCU. Here, if the MCU 51 is selected, the circuit 71 becomes to be connected to the MCU 50. In addition, based on the information for the determination, the sum total of fees is calculated and obtained, for example, in case of assuming that the terminals are connected to each other with each MCU placed at a center. Also, if the information is not enough for the sole determination by the MCU 50, the MCU 50 conducts communication with other MCUs 51 and 52 and determines the optimum MCU based on information obtained from each of the MCUs 51 and 52.

After the optimum MCU 51 is determined in this manner, the demand for the opening is transmitted to the MCU 51. And then, after the connections between MCUs are cut and a notice of the opening from the MCU 51 is issued to the terminal 40, the circuit 70 is cut. Thereafter, the circuits 60–65 are connected between the MCU 51 and each of the terminals 40–45, and the conference is held in an optimum connecting form.

As mentioned above, the optimum MCU is determined based on the information of the terminal control table which is stored in the MCU, using information of the terminal control tables of other MCUs also if necessary.

However, although, in this prior art, the MCUs are needed in addition to the terminals for determining the optimum MCU and setting communication paths, the MCUs do not always exist in case of bringing unspecified radio terminals to arbitrary places.

Also, since the MCUs have the terminal control table and the terminals do not have the terminal control tables, communication of the terminal information cannot be conducted by only the terminals, and accordingly, the optimum MCU (which is a tentative master in the present invention) cannot be determined by only the terminals.

SUMMARY OF THE INVENTION

Therefore, the objective of the present invention is to solve the above-described task, and is to provide a system for or a method of determining an optimum tentative master in case of bringing an unspecified number of radio terminals, temporally constituting a network, and conducting communication.

In the present invention for achieving the above-described objective, each radio terminal has a unit (a self-terminal information storing section 4 in FIG. 1) for storing terminal information (such as remaining power of a battery, transmission power of a radio section, and a terminal processing speed) of its own, a unit (an other terminal information storing section 3 in FIG. 1) for receiving terminal information of other terminals and storing it, and a unit (a master determining section 2 in FIG. 1) for determining a radio terminal to be an optimum tentative master, and in case of determining a tentative master, when a user arbitrarily selects one radio terminal, other radio terminals connect circuits to the radio terminal (referred to FIG. 2) and transmit terminal information thereto, and determine a tentative master in the terminal, and thereafter, re-connect the circuits to the terminals to be a tentative master newly to construct a temporary network (referred to FIG. 3).

Each of the radio terminals has terminal information, and can freely communicate the information with other radio terminals via radio. Also, each of the radio terminals can temporarily store the terminal information transmitted from the other radio terminals. In case of determining a tentative master, by selecting one appropriate radio terminal and collecting the terminal information to the selected radio terminal, the master determining section of the radio terminal successively compares the stored terminal information with each other, and can determine an optimum tentative master while giving priority to, for example, remaining power of a battery in case of desiring to maintain a network for a long time and transmission power of the radio terminal in case of desiring to make a network range wide.

BRIEF DESCRIPTION OF THE DRAWINGS

This and other objects, features and advantages of the present invention will become more apparent upon a reading of the following detailed description and drawings, in which:

FIG. 4 is an illustrative view showing one example of terminal information which the radio terminal in one embodiment of the present invention has.

DESCRIPTION OF THE EMBODIMENTS

Figure 1:
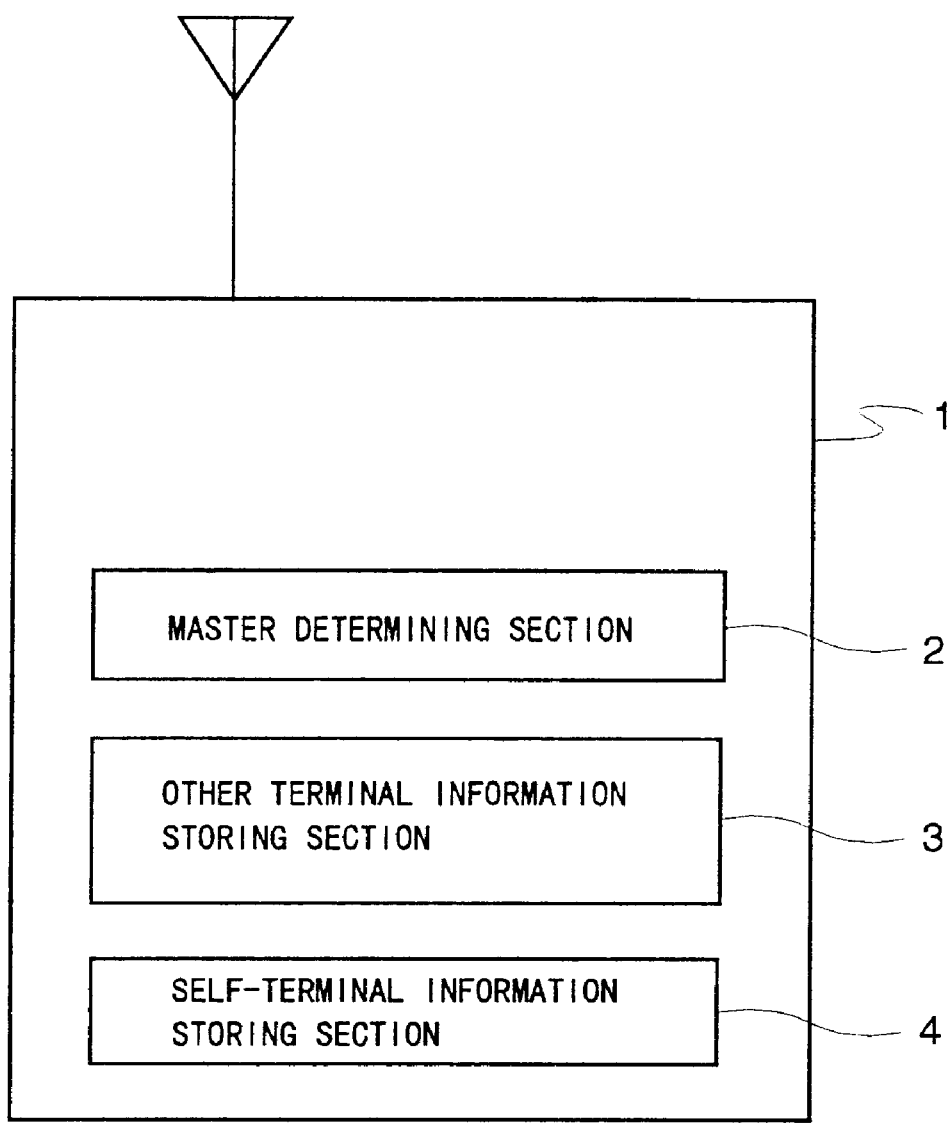
FIG. 1 is a view showing the construction of a radio terminal in one embodiment of the present invention.

An embodiment of the present invention will be explained. FIG. 1 shows an example of the construction of a radio terminal in an embodiment of the present invention. A radio terminal 1 has a self-terminal information storing section 4 for storing terminal information of its own, an other terminal information storing section 3 for temporarily storing terminal information which is received from other terminals, and a master determining section 2 for determining an optimum tentative master based on the terminal information in these storing sections 3 and 4.

Next, operation of the radio terminal will be explained.

At first, one radio terminal (any one of radio terminals may be available) is appropriately selected from radio terminals, each of which has construction same as that of the radio terminal 1 in FIG. 1, and the selected radio terminal is made to determine a tentative master (, which is also referred to as a tentative master determining terminal). After the tentative master determining terminal is determined, the radio terminal starts transmission of a synchronous signal by means of radio, and enables the other radio terminals to be connected to communication paths.

Figure 2:
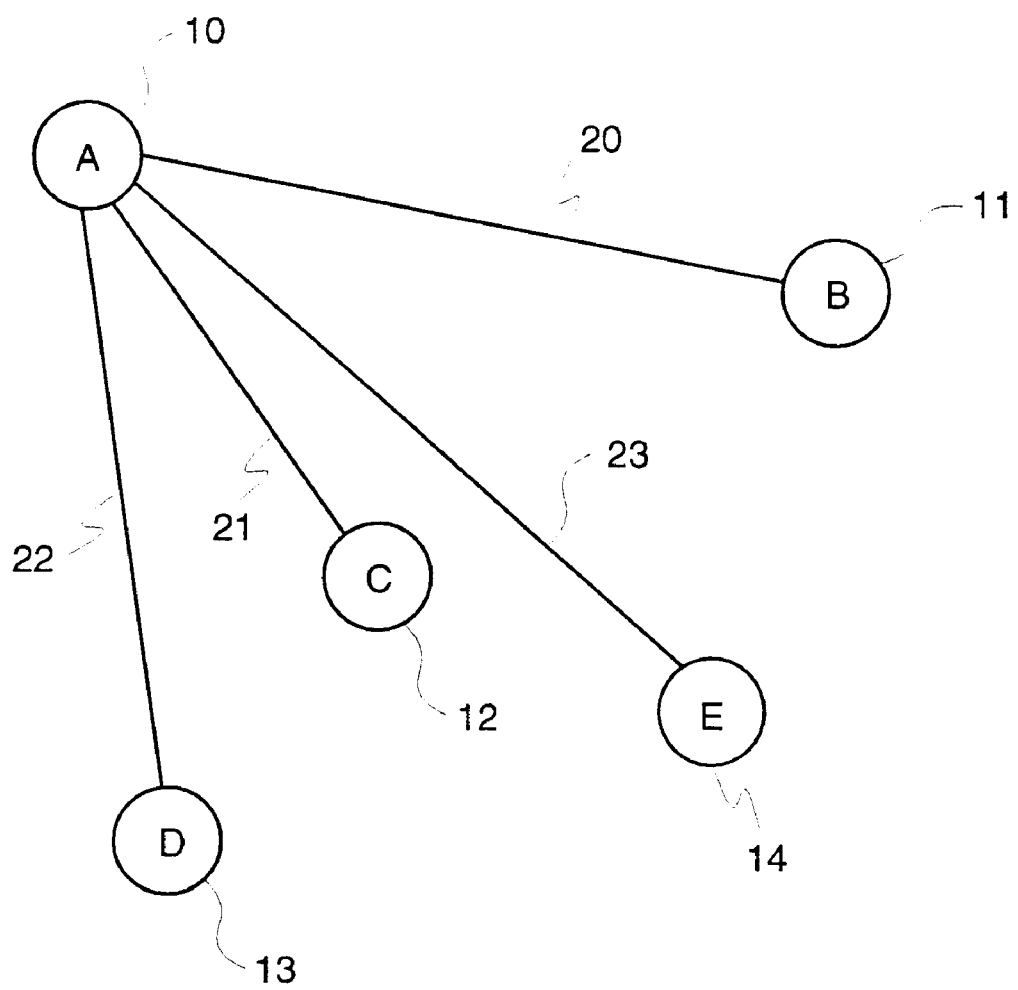
FIG. 2 is a view showing the entirety of a system in one embodiment of the present invention, which shows condition before determining a master.

The other radio terminals synchronize with this synchronous signal, respectively, and set up the communication paths between the tentative master determining terminal and the other radio terminals (condition shown in FIG. 2). Thereafter, the terminal information (FIG. 4) stored in each radio terminal is transmitted to the tentative master determining terminal.

The tentative master determining terminal stores the terminal information of the other radio terminals in the other terminal information storing section 3. The tentative master determining terminal waits until reception of all of the terminal information is completed. Thereafter, the tentative master determining terminal inputs all of the terminal information (including the self-terminal information and the other terminal information) to the master determining section 2 and determines a tentative master. A determination criterion used here is concurrently set when a user selects the tentative master determining terminal, and wherein the tentative master can be determined by giving priority to, for example, remaining power of a battery in case of desiring to maintain a temporary network for a long time and transmission power of the radio terminal in case of desiring to make a network range wide.

After the tentative master is determined in this manner, the tentative master determining terminal notifies the radio terminal which has been determined as the tentative master and the radio terminals other than the radio terminal of a result of the determination. And then, the communication circuits are cut. Thereafter, the radio terminal which has become to be the tentative master newly starts transmission of a synchronous signal, and waits until communication paths are set by the other radio terminals. The other radio terminals then detect the synchronous signal from the tentative master and set the communication paths.

Figure 3:
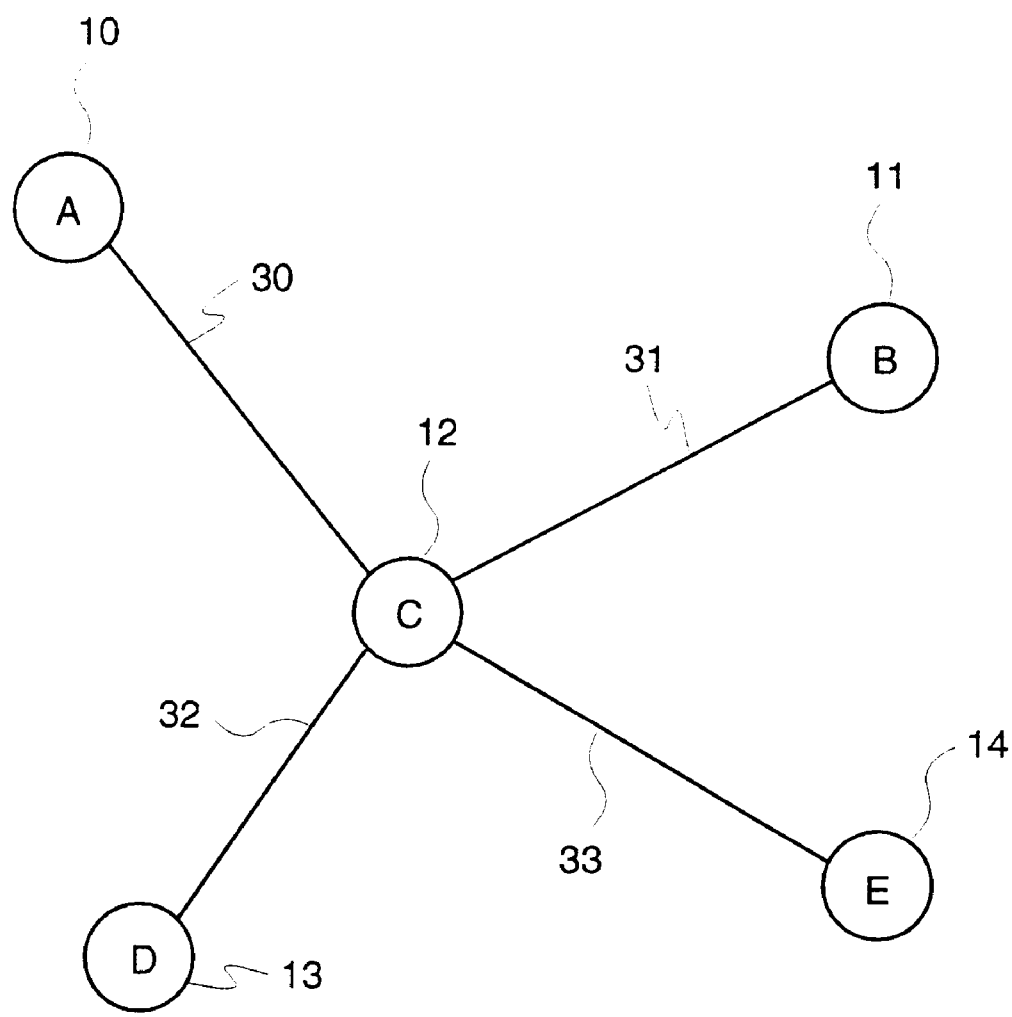
FIG. 3 is a view showing the entirety of a system in one embodiment of the present invention, which shows condition after determining a master.
Figure 5:
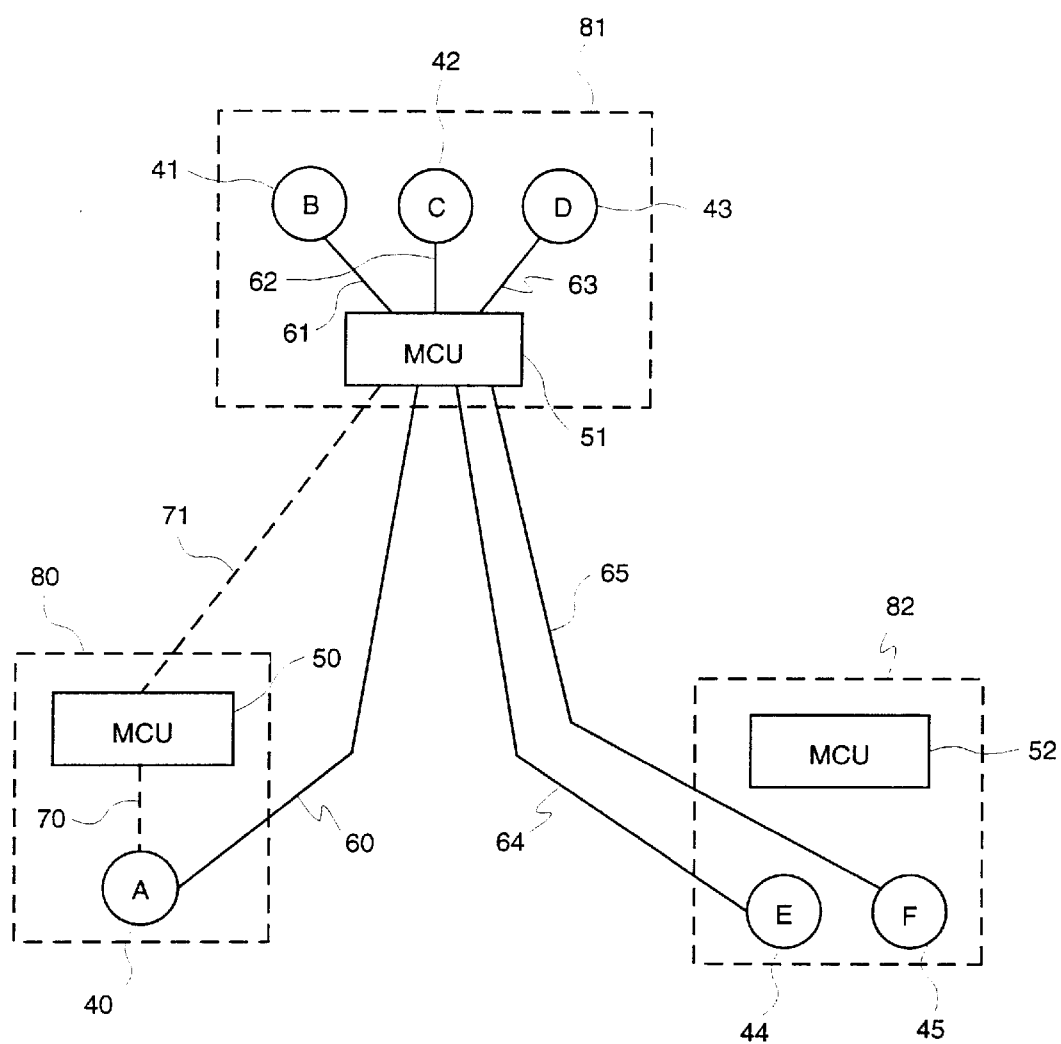
FIG. 5 is a view showing the construction of the entirety of a system that shows an example of a prior art.

In this manner, construction of a temporary network is completed (condition shown in FIG. 3).

Next, a particular example will be explained.

FIG. 2 shows the operation in determining a tentative master in case that a radio conference is held between radio terminals 10–14 indicated as "A"–"E". It is assumed that the radio terminals 11–14 set communication paths 20–23 for the radio terminal 10 (also referred to as a tentative master determining terminal 10), and conduct transmission of terminal information (such as information shown in FIG. 4).

FIG. 3 represents the operation after the determination of the tentative master in this example. FIG. 3 shows condition that the radio terminals 10 and 11 and the radio terminals 13 and 14 set communication paths 30–33 for the radio terminal 12 (also referred to as a tentative master 12), and constitute a temporary network and conduct communication with each other.

FIG. 4 is an illustrative view showing one example of the terminal information which the radio terminals in one embodiment of the present invention has, and the terminal information is constructed of remaining power of a battery of the radio terminal, transmission power of a radio section, a processing speed of the terminal and network address information.

At first, one radio terminal (any one of the radio terminals may be available) is appropriately selected from the radio terminals 10–14, and the selected radio terminal is made to determine a tentative master (, which is also referred to as a tentative master determining terminal). Here, the tentative master determining terminal is assumed to be the radio terminal 10. After the tentative master determining terminal 10 is determined, the radio terminal 10 starts transmission of a synchronous signal by means of radio, and the radio terminals 11–14 detect the synchronous signal, and thereby, the communication paths 20–23 can be set up.

The radio terminals 11–14 synchronize with this synchronous signal, respectively, and set up the communication paths 20–23 between the tentative master determining terminal 10 and the radio terminals 11–14 (condition shown in FIG. 2). Thereafter, the terminal information (FIG. 4) stored in the radio terminals 11–14 is transmitted to the tentative master determining terminal 10. The tentative master determining terminal 10 stores the terminal information of the radio terminals 10–14 in the other terminal information storing section 3.

Thereafter, the tentative master determining terminal 10 inputs all of the terminal information stored in the self-terminal information storing section 4 and the other terminal information storing section 3 to the master determining section 2 and conduct the determination of a tentative master. A determination criterion used here is concurrently set when a user selects the tentative master determining terminal 10. However, the tentative master can be determined by giving priority to remaining power of a battery, since it is necessary to operate the certain radio terminal for a long time as the tentative master in case of desiring to maintain a temporary network for a long time for example, and also, the tentative master can be determined by giving priority to transmission power of the radio terminal, since it is necessary to transmit a radio wave farther in case of desiring to make a network range wide. Here, it is assumed that the radio terminal 12 is determined as the tentative master by giving priority to the remaining power of the battery.

After the tentative master is determined in this manner, the tentative master determining terminal 10 notifies the radio terminal 12 which has been determined as the tentative master and the radio terminals 10 and 11 and the radio terminals 13 and 14 other than the radio terminal 12 of a result of the determination. And then, the communication circuits 20–23 are cut.

Thereafter, the radio terminal 12 which has become to be the tentative master newly starts transmission of a synchronous signal, and waits until the radio terminals 10 and 11 and the radio terminals 13 and 14 set up the communication paths 30–33, respectively. The radio terminals 10 and 11 and the radio terminals 13 and 14 then detect the synchronous signal from the tentative master and set the communication paths 30–33.

In this manner, construction of the temporary network is completed (condition shown in FIG. 3). Thereafter, communication between the radio terminals 10–14 is conducted.

In accordance with the present invention, when the radio terminals are brought and the tentative master of the temporary network is determined, it is possible to automatically determine the tentative master regardless of kinds or condition of the radio terminals. This is because, in determining the tentative master, communication of the terminal information is automatically conducted between radio terminals and the tentative master is determined. Thereby, it is not necessary for a user to take time or labor for look into the radio terminals one by one and determining the optimum tentative master, and it is possible to improve convenience for use. Accordingly, if the number of the radio terminals increases, this provide the user with more efficiency.

Also, a device other than the radio terminals is not needed when the radio terminals are brought and the temporary network is constructed. This is because a corresponding function is built in the radio terminals. Thereby, if the radio terminals exist, it becomes to be possible to simply construct the network everywhere.

The entire disclosure of Japanese Patent Application No. 9-305856 filed on Nov. 7, 1997 including specification, claims, drawing and summary are incorporated herein by reference in its entirety.

What is claimed is:

1. A system for determining a tentative master of a radio conference system in which an unspecified number of radio terminals are collected at arbitrary places, a network is temporarily constructed by making a certain terminal of said radio terminals to be a tentative master that is a temporary master and synchronizing with one channel issued from said tentative master, and communication is conducted, wherein said radio terminals comprise:
a self-terminal information storing means for storing terminal information of its own;
an other terminal information storing means for temporarily storing terminal information which is transmitted from other terminals; and
a master determining means for determining a terminal appropriate for being a tentative master, based on said stored terminal information, and
a network is temporarily constructed by making said determined radio terminal to be said tentative master.

2. A system for determining a tentative master of a radio conference system according to claim 1, wherein said master determining means determines said tentative master based on specified information of said terminal information such as transmission power, battery information and network address information.

3. A system for determining a tentative master of a radio conference system according to claim 2, wherein said master determining means successively compares said stored terminal information with each other and determines said tentative master while giving priority to said battery information in case of desiring to maintain said network for a long time.

4. A system for determining a tentative master of a radio conference system according to claim 2, wherein said master determining means successively compares said stored terminal information with each other and determines said tentative master while giving priority to said transmission power in case of desiring to make a range of said network wide.

5. A method of determining a tentative master of a radio conference system, comprising steps of: collecting an unspecified number of radio terminals at arbitrary places; temporarily constructing a network by making a certain terminal of said radio terminals to be a tentative master that is a temporary master and synchronizing with one channel issued from said tentative master; and conducting communication, wherein said radio terminals comprise:
a self-terminal information storing means for storing terminal information of its own;
an other terminal information storing means for temporarily storing terminal information which is transmitted from other terminals; and
a master determining means for determining a terminal appropriate for being a tentative master, based on said stored terminal information, and
a network is temporarily constructed by making said determined radio terminal to be said tentative master.

6. A method of determining a tentative master of a radio conference system according to claim 5, wherein said master determining means determines said tentative master based on specified information of said terminal information such as transmission power, battery information and network address information.

7. A system for determining a tentative master of a radio conference system according to claim 6, wherein said master determining means successively compares said stored terminal information with each other and determines said tentative master while giving priority to said battery information in case of desiring to maintain said network for a long time.

8. A system for determining a tentative master of a radio conference system according to claim 6, wherein said master determining means successively compares said stored terminal information with each other and determines said tentative master while giving priority to said transmission power in case of desiring to make a range of said network wide.

* * * * *